United States Patent [19]

Ostrowski

[11] 4,205,734
[45] Jun. 3, 1980

[54] HYDRAULIC BRAKING SYSTEMS FOR VEHICLES

[75] Inventor: Piotr Ostrowski, Sutton Coldfield, England

[73] Assignee: Girling Limited, Birmingham, England

[21] Appl. No.: 877,387

[22] Filed: Feb. 13, 1978

[30] Foreign Application Priority Data

Feb. 11, 1977 [GB] United Kingdom ............... 5871/77

[51] Int. Cl.² .............................................. B60T 11/24
[52] U.S. Cl. ........................................ 188/16; 60/581; 188/354
[58] Field of Search ............... 188/16, 152, 354; 303/6 R; 60/581; 180/6.24, 6.26

[56] References Cited

U.S. PATENT DOCUMENTS

| 2,741,337 | 4/1956 | Ziskal | 188/16 |
| 2,822,891 | 2/1958 | Wallace | 188/354 |
| 3,400,788 | 9/1968 | Brace | 188/354 |

FOREIGN PATENT DOCUMENTS 51838  7/1967  Poland ........................................ 188/16

Primary Examiner—Edward R. Kazenske
Attorney, Agent, or Firm—Scrivener, Parker, Scrivener and Clarke

[57] ABSTRACT

In a two-pedal hydraulic braking system for vehicles the pedals are operable independently or simultaneously to apply two sets of brakes and both pedals actuate a common master cylinder to apply fluid under pressure to the brakes. Two normally closed selector valves are operable independently to direct the fluid to either of the sets of brakes when one pedal is operated, and the valves are operable simultaneously to direct the fluid to both sets when the pedals are operated simultaneously. Each valve is urged directly into its closed position by its respective pedal, and each pedal in turn is urged by a return spring into a retracted position in which the valve which it operates is closed.

7 Claims, 3 Drawing Figures

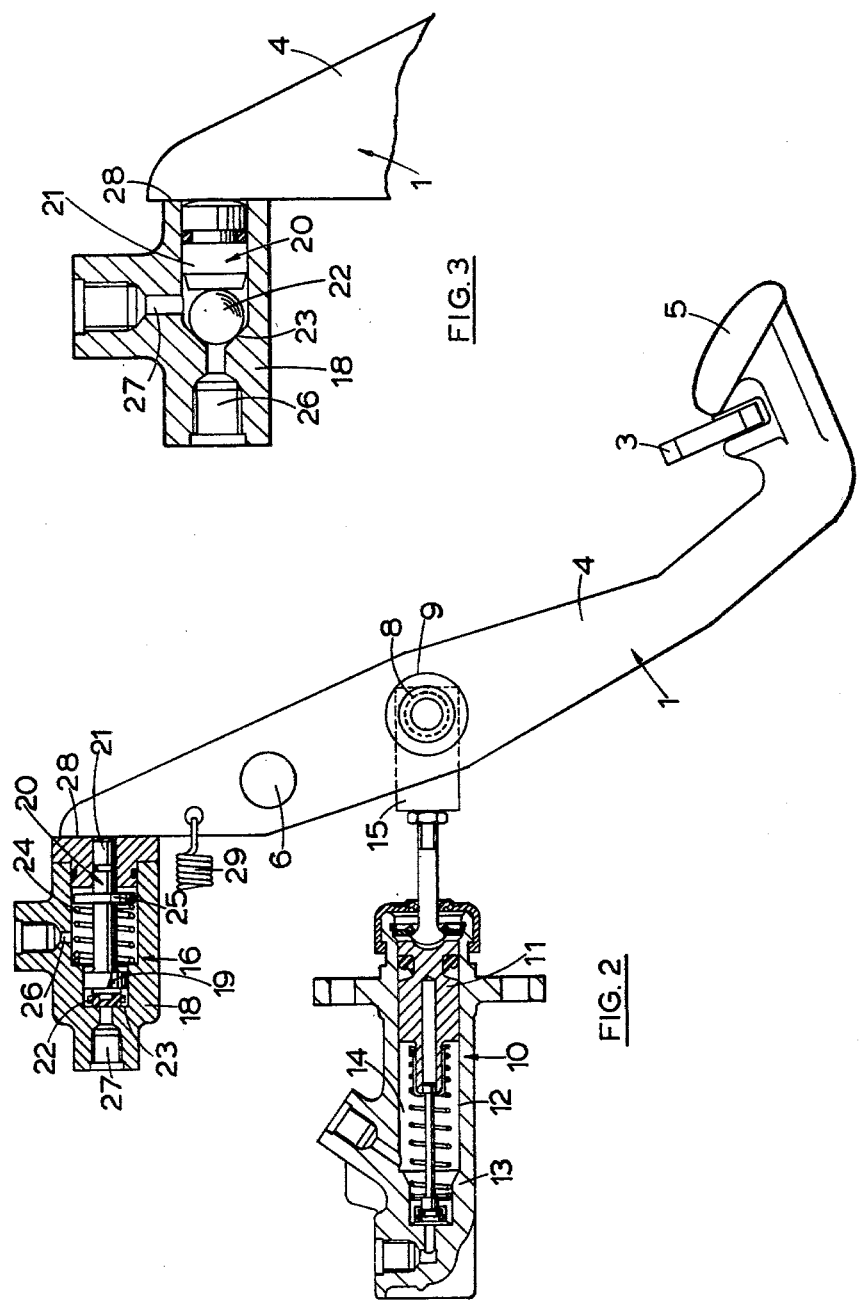

HYDRAULIC BRAKING SYSTEMS FOR VEHICLES

SPECIFIC DESCRIPTION

This invention relates to hydraulic braking systems for vehicles of the kind in which there are two pedals which are operable independently or simultaneously to apply two sets of brakes and both pedals actuate a common master cylinder to apply fluid under pressure to the brakes, the supply of fluid to the brakes being controlled by two normally closed selector valves which are operable independently to direct the fluid to either of the sets of brakes when one of the pedals is operated and which are operable simultaneously to divert the fluid to both sets of brakes when the pedals are operated simultaneously.

In one known hydraulic braking system of the kind set forth each normally closed valve is operated by a respective one of the pedals through a linkage, and each pedal is urged by a return spring into a retracted position in which the valve which it operates is closed and in which the pedal is in engagement with a stop abutment remote from the valve assembly.

According to our invention in an hydraulic braking system of the kind set forth each normally closed valve is urged directly into its closed position by its respective pedal, and each pedal in turn is urged by a return spring into a retracted position in which the valve which it operates is closed.

This simplifies the construction and provides positive operation of the selector valve with a minimum of delay since substantially all lost-motion is eliminated.

Preferably each pedal comprises a lever which is directly engagable at its upper end with a valve operating member of its respective selector valve and the lever at its lower end carries a foot receiving pad, the lever being pivotally mounted at a first intermediate point in its length for angular movement about a fixed pivotal axis, and both levers at corresponding second intermediate points in their lengths being connected to opposite ends of a balance bar which acts at an intermediate point in its length on the piston of the master cylinder.

One embodiment of our invention and a modification are illustrated in the accompanying drawings in which:

FIG. 2 is a side elevation of the same including longitudinal section through the master cylinder and one of the selector valves; and FIG. 3 is a longitudinal selector through a modified selector valve.

Figure 1:
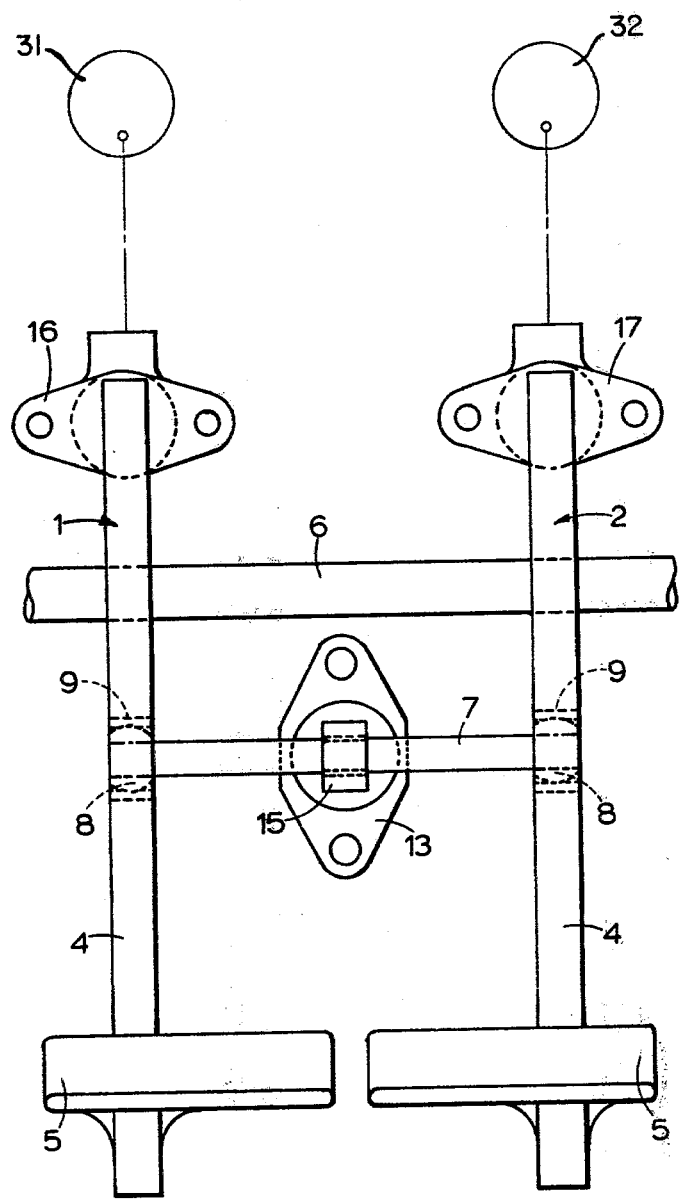
FIG. 1 is a plan of a two pedal control system for hydraulic brakes on a tractor or like vehicle.

In the two pedal control system illustrated in the drawings, the brakes 31, 32 on wheels on opposite sides of a tractor or like vehicle are adapted to be applied by depression of either or both of two pedals 1 and 2, to assist steering and for braking purposes respectively. When the pedals are to be depressed simultaneously they can be coupled together in a known manner by a pivoted latch 3.

Each pedal 1 and 2 comprises a lever 4 carrying at its lower end a foot receiving pad 5, and both levers 4 are freely mounted at corresponding intermediate points in their lengths for angular movement about a transverse shaft 6.

At a point between the shaft 6 and the pad 5 each lever 4 is connected to one end of transverse balance bar 7, with part spherical fittings 8 at opposite ends of the bar 7 being received in complementary openings 9 in the levers 4.

A single hydraulic master cylinder 10 is mounted between the pedals 1 and 2 has a piston 11 which is movable into a bore 12 in a housing 13 to pressurise fluid in a pressure space 14 in front of the piston, and the piston 11 is operated by a push-rod assembly 15 which is pivotally connected to substantially the mid-point in the length of the balance bar 7.

The pressure space 14 is connected in series to both the brakes through two selector valves 16, 17, each being operable by one of the pedals 1 and 2 respectively to control the supply of fluid to the brakes on a respective one side of the vehicle. Each selector valve 16, 17 comprises a housing 18 incorporating an axially movable valve member 19 which is carried by one end of a stem 20. The opposite end of the stem 20 comprises a plunger 21 which works in a sealed bore in the opposite end of the housing 18. The free end of the plunger 21 projects from the housing 18 and is engaged by the end of the lever 4 which is remote from the pad 5 of a respective pedal 1, 2. The end of the valve member 19 remote from the stem carries a head 22 which, when the pedal 1, 2 is in a retracted position illustrated, engages with a seating 23 in the housing 18 against the loading in a return spring 24 which engages with a radial abutment 25 on the stem 20. This cuts-off communication between an inlet port 26 connected to the pressure space 14 of the master cylinder 10 through a pipe-line (not shown) and an outlet port 27 connected to the brakes on the wheels on that side of the vehicle. The retracted position of each pedal is defined by a fixed stop abutment comprising the seating 23. The reaction on the pedal 1, 2 from a return spring 29 which acts on the lever 4 is transmitted to the abutment through the head 22 and the stem 20 by the engagement of the lever 4 with the free end of the plunger 21 which projects slightly from an end face 28 of the housing 18, even when head 22 engages the seating 23.

When both pedals are depressed simultaneously, the master cylinder 10 is actuated from the balance bar 7, and both selector valves 16, 17 are opened by the action of the springs 24 to urge the valve heads 22 away from the seatings 23, as the levers 4 move away from their respective stop abutments.

When one pedal only is depressed, the master cylinder 10 is actuated by movement of the balance bar 7 pivoting about the part-spherical connections 8 with the levers 4, and the corresponding selector valve is opened to permit fluid to be supplied only to the brakes operated by that pedal. The other selector valve remains closed since the other pedal is still in its retracted position with the head 22 held firmly against its seating 23.

The selector valves can be replaced by modified valves of which one is shown in FIG. 3. In this construction the spring 24 is omitted and the valve head 22 comprises a ball which is separate from the valve stem 20. In this construction the valve stem 20 is relatively short in length and is constructed wholly by the plunger 21. In addition the position of the ports 26 and 27 is reversed. When a pedal 1, 2 is moved away from the respective abutment face 28, the pressure fluid from the master cylinder entering the housing 18 through the port 26 acts on the ball 22 to urge it away from the seating 23.

The construction and operation of the valve of FIG. 3 is otherwise the same as each slector valve incorporated in the embodiment of FIGS. 1 and 2, and corresponding reference numerals have been applied to corresponding parts.

I claim:

1. An hydraulic braking system for a vehicle comprising two pedals operable independently and simultaneously to apply two sets of brakes, a common hydraulic master cylinder adapted to be actuated by said pedals to supply fluid under pressure to said sets of brakes, two normally closed selector valves for controlling said supply of fluid to said sets of brakes from said master cylinder, said selector valves being operable independently to direct said fluid to either of said sets of brakes when one of said pedals is operated and being operable simultaneously to direct said fluid to both said sets of brakes when said pedals are operated simultaneously, a return spring for urging each said pedal into a retracted position, wherein each selector valve has a valve-operating member having a thrust receiving part, and each pedal comprises a rigid lever having an upper end, a lower end, and a foot receiving pad carried by said lower end, said upper end defining a thrust transmitting part which is in direct abutting engagement with said thrust receiving part of said corresponding valve-operating member without the interposition of linkage means to urge a corresponding one of said selector valves into a closed position when said pedal is in said retracted position, means independent of each pedal to effect opening of its corresponding valve upon movement of said thrust transmitting part of said pedal in a direction away from the thrust receiving part of the corresponding valve operating member, first pivotal mountings at corresponding first intermediate points in the lengths of said levers being provided to define a common pivotal axis about which said levers are angularly movable, second pivotal mountings being provided at corresponding second intermediate points in the lengths of said levers, and a balance bar is incorporated for actuating said master cylinder, said balance bar having opposite ends to which both said levers are connected by said second pivotal mountings, and said balance bar having an output point disposed at an intermediate point in the length thereof for acting on said master cylinder.

2. An hydraulic braking system as described in claim 1, wherein each normally closed selector valve comprises a housing having a seating, an inlet port connected to said master cylinder, and an outlet port for connection to a corresponding one of said sets of brakes, and a valve member normally urged by a respective one of said pedals into engagement with said seating to cut-off communication between said inlet port and said outlet port.

3. An hydraulic braking system as claimed in claim 2, wherein said valve member comprises a valve head for engagement with said seating which surrounds said outlet port, and an axially movable stem carrying at one end said valve head and at the other end being engaged by said pedal, said valve opening means comprising a spring acting on said stem to urge said head away from said seating when said pedal is moved relatively away from a stop abutment which defines the retracted position of said pedal.

4. An hydraulic braking system as claimed in claim 3, wherein said stem comprises a plunger which works in a bore in an end of said housing adjacent to said pedal.

5. An hydraulic braking system as claimed in claim 2, wherein said valve member comprises a ball for engagement with said seating which surrounds said inlet port, and an axially movable stem is separate from and acts between said ball and said pedal which engages with an end of said stem remote from said ball, said valve opening means comprising hydraulic pressure from said master cylinder which moves said ball away from said seating when said pedal is moved relatively away from a stop abutment which defines the retracted position of said pedal.

6. An hydraulic braking system as claimed in claim 5, wherein said stem comprises a plunger which works in a bore in an end of said housing adjacent to said pedal.

7. An hydraulic braking system as claimed in claim 2, wherein a stop abutment for each of said pedals comprises said seating and said valve member projects slightly from one adjacent end of said housing of a respective one of said valves when said valve is in the closed position, to transmit to said seating the reaction on said pedal from said return spring.

* * * * *